United States Patent Office 3,022,287
Patented Feb. 20, 1962

3,022,287
METHOD OF PREPARING CELLULOSE ESTERS OF TRIMELLITIC ACID
John W. Mench, John Emerson, and Martin E. Rowley, Rochester, N.Y., assignors to Eastman Kodak Company, Rochester, N.Y., a corporation of New Jersey
No Drawing. Filed Jan. 13, 1960, Ser. No. 2,113
6 Claims. (Cl. 260—224)

This invention relates to the preparation of cellulose esters of trimellitic acid which involves reacting cellulose or a cellulose derivative with trimellitic acid anhydride in which a lower fatty acid is employed as the solvent and an acid soluble salt basic in character is employed as the catalyst.

Tricarboxylic acid esters of cellulose have been prepared heretofore as shown, for instance, in U.S. Patent No. 2,380,896. In that patent a suitable hydrolyzed cellulose derivative is reacted with the anhydride or acid chloride of a polycarboxylic acid using 1,4-dioxane as the solvent. That patent indicates that 1,4-dioxane has unique properties which especially adapts it for use as a solvent medium in the described reaction and that when other solvent diluents are employed the products obtained do not exhibit the solubility properties of the products which result when 1,4-dioxane solvent is used.

One object of our invention is to provide a method of preparing tricarboxylic acid esters of cellulose having good solubility properties. Another object of our invention is to prepare tricarboxylic acid esters of cellulose by reacting upon cellulose or a cellulose derivative with trimellitic anhydride in which a lower fatty acid is employed as the solvent and an acid soluble salt showing a basic reaction is employed as the catalyst. Other objects of our invention will appear herein.

We have found that tricarboxylic acid esters of cellulose having solubility in a wide variety of organic solvents may be prepared by reacting upon cellulose or a cellulose derivative with trimellitic anhydride in an esterification bath which does not employ 1,4-dioxane as the reaction medium. We have found that reaction upon cellulose or a cellulose derivative with trimellitic anhydride in a procedure in which a lower fatty acid is employed as the solvent and an acid soluble salt basic in character is employed as the catalyst gives products soluble in a wide variety of organic solvents and with esterification to a sufficient degree, solubility in dilute aqueous solutions of organic or inorganic bases.

The reaction in accordance with our invention may be carried out by reacting upon either cellulose or a hydrolyzed cellulose derivative such as partially acylated or partially etherified cellulose with trimellitic anhydride. Anhydrous acetic acid is conveniently employed as the solvent although some other lower fatty acid solvent such as propionic or butyric acid may be employed if desired. Some of the catalysts especially useful in this process are the acetates of the alkali metals, the alkaline earth metals or the organic amines. Some useful catalysts are sodium acetate, potassium acetate, calcium acetate, magnesium acetate, monomethyl amine acetate, pyridine acetate and the like. The catalyst may be employed in various proportions. Ordinarily, 100% of catalyst, based on the weight of the cellulose starting material, is convenient, but amounts within the range of 5–150% of catalyst, based on the weight of the cellulose starting material, can be employed to promote the esterification. With higher proportions of catalyst the use of higher proportions of aliphatic acid is recommended.

The starting material may be cellulose, ethyl cellulose containing free and esterifiable hydroxyl groups or a lower fatty acid ester of cellulose (such as cellulose acetate, cellulose acetate propionate, cellulose acetate butyrate, cellulose propionate, etc.) containing free and esterifiable hydroxyl groups.

When the trimellitic acid ester of cellulose is sufficiently esterified that it contains above about 16% of trimellityl, the products obtained are often soluble in dilute aqueous alkaline solutions such as in aqueous sodium bicarbonate of 1 or 2% concentration. These products are characterized by solubility in aqueous alkaline solutions at a somewhat lower pH than required for solubility for corresponding dicarboxylic acid esters of cellulose. Another characteristic of the trimellitic acid cellulose derivatives is their tolerance to or compatibility with polybasic cations which, in the case of cellulose phthalate, generally cause increase in viscosity or even precipitation. In general, the trimellitic acid esters of cellulose containing more than 0.2 trimellityl groups per glucose unit are water insoluble but soluble in aqueous alkali, while those containing .05–0.20 trimellityl groups are insoluble in both water and aqueous alkali.

The alkali soluble trimellitic acid esters of cellulose have been found to be useful as antihalation backings or coatings for photographic film and as enteric coatings for medical pills and capsules while the alkali insoluble esters are useful as adsorbents for cations from aqueous solutions thereof. The trimellitic acid esters of cellulose appear to have more tolerance for inorganic salts than the dicarboxylic acid esters of cellulose.

The following examples illustrate the preparation of trimellitic acid esters of cellulose in accordance with our invention.

Example 1

25 parts of ethyl cellulose containing 45% ethoxyl was dissolved in 100 parts of acetic acid containing 15 parts of potassium acetate and 25 parts of trimellitic anhydride. The mass was stirred at 100° C. for 3 hours. It was then diluted with acetic acid and the product was isolated by precipitating into water acidified with hydrochloric acid. The product was washed and dried and was found to be a trimellitate of ethyl cellulose containing 19.5% trimellityl. The product was readily soluble in an aqueous 1.5% solution of sodium bicarbonate at room temperature.

Example 2

The same procedure as employed above was followed using as the starting material 25 parts of ethyl cellulose having a 47% ethoxyl content. The ethyl cellulose trimellitate obtained contained 18% trimellityl and was readily soluble in 1.5% sodium bicarbonate solution at room temperature.

Example 3

Example 1 was repeated but using 25 parts of ethyl cellulose containing 48.5% ethoxyl. The product contained 13.2% trimellityl and was soluble in 1.5% sodium bicarbonate solution with slight cooling.

Example 4

25 parts of cellulose acetate having an acetyl content of 39.5% was heated for 3 hours at 100° C. in 75 parts of acetic acid containing 15 parts of potassium acetate and 25 parts of trimellitic anhydride. The product was precipitated as described in the preceding examples. The material obtained was found to be a cellulose acetate trimellitate having 21% trimellityl. The product was highly swollen but insoluble in 1.5% sodium bicarbonate solution.

Example 5

50 parts of cellulose acetate having an acetyl content of 32% was reacted for 6 hours at 100° C. in 150 parts of acetic acid containing 10 parts of sodium acetate and 71 parts of trimellitic anhydride. The product obtained was a cellulose acetate trimellitate containing 16.5% trimellityl. The product was of borderline solubility in 1.5% sodium bicarbonate solution.

Example 6

One part of cellulose diacetate was dissolved in 6 parts of acetic acid and 1 part of trimellitic anhydride. 0.5 part of sodium acetate was added and the mass was heated to 100° C. for 2 hours. The product was then precipitated into 10 parts of dilute aqueous hydrochloric acid. It was washed free of impurities with hot water and dried. The cellulose acetate trimellitate obtained contained 22% acetyl and 28% trimellityl. The product was insoluble in water but readily soluble in 1% sodium bicarbonate solution and in acetone, dimethyl formamide and other cellulose ester solvents.

Example 7

One part of wood pulp was slurried in a mixture of 8 parts of acetic acid, 0.5 part of sodium acetate and 1 part of trimellitic anhydride. The mixture was heated to 100° C. for 3 hours, washed and dried. The product contained 19% trimellityl groups.

The reaction described herein can also be employed for preparing trimellitic acid esters of starch. For instance, starch may be mixed with water to form a smooth paste, then precipitated and dewatered with acetic acid. The resulting material may then be reacted for 8 hours at 100° C. with a bath consisting of acetic acid, potassium acetate and trimellitic anhydride to obtain a product soluble in 1.5% sodium bicarbonate solution in water.

We claim:

1. A method of preparing tricarboxylic acid esters of cellulose which comprises reacting upon a cellulose material containing free and esterifiable hydroxyl groups with trimellitic anhydride in an esterification bath employing lower fatty acid solvent and as the catalyst an acid soluble salt having a basic reaction.

2. A method of preparing a tricarboxylic acid ester of cellulose which comprises reacting upon ethyl cellulose containing free and esterifiable hydroxyl groups with trimellitic anhydride in an esterification bath employing acetic acid as the solvent and as the catalyst sodium acetate.

3. A method of preparing a tricarboxylic acid ester of cellulose which comprises reacting upon ethyl cellulose containing free and esterifiable hydroxyl groups with trimellitic anhydride in an esterification bath employing acetic acid as the solvent and as the catalyst potassium acetate.

4. Ethyl cellulose trimellitate.

5. The method of claim 1 wherein the cellulose material is cellulose acetate containing free and esterifiable hydroxyl groups.

6. A method of preparing a tricarboxylic acid ester of cellulose which comprises reacting upon cellulose acetate containing free and esterifiable hydroxyl groups with trimellitic anhydride in an esterification bath employing acetic acid as the solvent and sodium acetate as the catalyst.

References Cited in the file of this patent

UNITED STATES PATENTS

| | | |
|---|---|---|
| 1,908,499 | Webber et al. | May 9, 1933 |
| 2,196,768 | Hiatt | Apr. 9, 1940 |
| 2,380,896 | Kaszuba | July 31, 1945 |
| 2,632,006 | Blume | Mar. 17, 1953 |